US009013829B2

(12) United States Patent
Sumiji

(10) Patent No.: US 9,013,829 B2
(45) Date of Patent: Apr. 21, 2015

(54) SPINDLE MOTOR AND DISK DRIVE APPARATUS

(71) Applicant: Nidec Corporation, Kyoto (JP)

(72) Inventor: Akinobu Sumiji, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/267,032

(22) Filed: May 1, 2014

(65) Prior Publication Data

US 2015/0055246 A1 Feb. 26, 2015

(30) Foreign Application Priority Data

Aug. 26, 2013 (JP) .................................. 2013-175068

(51) Int. Cl.
*G11B 17/02* (2006.01)
*H02K 7/08* (2006.01)
*G11B 19/20* (2006.01)

(52) U.S. Cl.
CPC ................ *H02K 7/086* (2013.01); *H02K 7/083* (2013.01); *G11B 19/2009* (2013.01)

(58) Field of Classification Search
USPC ...................... 360/99.08, 99.16, 99.12, 99.06
See application file for complete search history.

(56) References Cited

U.S. PATENT DOCUMENTS

| 5,323,076 A | 6/1994 | Hajec |
| 5,697,708 A | 12/1997 | Leuthold et al. |
| 5,831,355 A * | 11/1998 | Oku ............................ 310/12.31 |
| 6,144,523 A | 11/2000 | Murthy et al. |
| 6,148,501 A | 11/2000 | Grantz et al. |
| 2005/0058373 A1 | 3/2005 | Heine et al. |
| 2006/0255673 A1 | 11/2006 | Sekii |
| 2009/0231754 A1 | 9/2009 | Sekii et al. |
| 2010/0052446 A1 | 3/2010 | Bauer |
| 2010/0195250 A1 | 8/2010 | Sekii et al. |
| 2011/0019303 A1* | 1/2011 | Yamada et al. .................. 360/55 |
| 2014/0286600 A1* | 9/2014 | Yamada et al. ............... 384/107 |

FOREIGN PATENT DOCUMENTS

| JP | 2003-264955 A | 9/2003 |
| JP | 2003-269445 A | 9/2003 |
| JP | 2005-337295 A | 12/2005 |
| JP | 2006-158015 A | 6/2006 |

* cited by examiner

*Primary Examiner* — Allen T Cao
(74) *Attorney, Agent, or Firm* — Keating & Bennett, LLP

(57) ABSTRACT

A spindle motor includes an upper bearing portion and a lower bearing portion each of which is inclined with respect to a central axis. The upper bearing portion includes an upper dynamic pressure generating groove defined in at least one of an upper outer circumferential surface of a shaft portion and an upper inner circumferential surface of a sleeve. The lower bearing portion includes a lower dynamic pressure generating groove defined in at least one of a lower outer circumferential surface of the shaft portion and a lower inner circumferential surface of the sleeve. The radial distance between a lower end portion of the upper dynamic pressure generating groove and the central axis is shorter than the radial distance between an upper end portion of the lower dynamic pressure generating groove and the central axis.

33 Claims, 8 Drawing Sheets

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

Spindle motors arranged to rotate disks are typically installed in hard disk apparatuses and optical disk apparatuses. Such a spindle motor includes a stationary portion fixed to a housing of the apparatus, and a rotating portion arranged to rotate while supporting the disk(s). The spindle motor is arranged to produce a torque by magnetic flux generated between a stator and a magnet, whereby the rotating portion is caused to rotate with respect to the stationary portion.

The stationary portion and the rotating portion of the spindle motor are joined to each other through a fluid dynamic bearing. A known spindle motor including the fluid dynamic bearing is described, for example, in JP-A 2006-158015. This known spindle motor includes an upper bushing and a lower bushing fixed to a shaft (See, for example, paragraph [0029] of JP-A 2006-158015). While the spindle motor is rotating, dynamic pressure grooves defined in an inner circumferential surface of a sleeve cause the sleeve to be out of contact with each of the upper and lower bushings (See, for example, paragraph [0034] of JP-A 2006-158015).

Regarding spindle motors in recent years, there has been a strong demand for a reduction in a magnitude of a drive current needed to obtain a desired rotation rate from the viewpoint of energy saving and environmental performance. The reduction in the value of the drive current can be achieved, for example, by arranging the fluid dynamic bearing at a radially inner position, where the moment is small and the circumferential velocity is slow, thereby reducing a friction loss at the fluid dynamic bearing.

However, a known spindle motor which includes a fluid dynamic bearing including a pair of upper and lower bearings each of which is inclined with respect to a central axis has a problem in that arranging both the upper and lower bearings more radially inward than before makes it difficult to rotate the spindle motor stably although a reduction in the friction loss at the fluid dynamic bearing is achieved.

SUMMARY OF THE INVENTION

A spindle motor according to a preferred embodiment of the present invention includes a stationary portion, a rotating portion, and a lubricating fluid. The rotating portion is rotatable about a central axis extending in a vertical direction. The lubricating fluid is provided between the stationary portion and the rotating portion. The stationary portion includes a base, a stator, a shaft portion, and a magnetic member. The stator includes a plurality of coils having an annular or substantially annular shape with the central axis as a center. The shaft portion extends along the central axis, and includes a lower end portion fixed to the base. The magnetic member is located on an upper surface of the base. The shaft portion includes an upper outer circumferential surface and a lower outer circumferential surface. The upper outer circumferential surface is inclined with respect to the central axis. The lower outer circumferential surface is inclined with respect to the central axis, and is located below the upper outer circumferential surface. A radial distance between the upper outer circumferential surface and the central axis decreases with decreasing height. A radial distance between the lower outer circumferential surface and the central axis decreases with increasing height. The rotating portion includes a sleeve and a magnet. The sleeve is tubular, and includes a central through hole through which the shaft portion is inserted. The magnet is opposite to the stator with a gap intervening therebetween, and is located above the magnetic member. The sleeve includes an upper inner circumferential surface and a lower inner circumferential surface. The upper inner circumferential surface is opposite to the upper outer circumferential surface, and is inclined with respect to the central axis. The lower inner circumferential surface is opposite to the lower outer circumferential surface below the upper inner circumferential surface, and is inclined with respect to the central axis. A radial distance between the upper inner circumferential surface and the central axis decreases with decreasing height. A radial distance between the lower inner circumferential surface and the central axis decreases with increasing height. The shaft portion, the sleeve, and the lubricating fluid together define a fluid dynamic bearing. The fluid dynamic bearing includes an upper bearing portion and a lower bearing portion. The upper bearing portion includes an upper dynamic pressure generating groove defined in at least one of the upper outer circumferential surface and the upper inner circumferential surface, and configured to induce a dynamic pressure during rotation of the rotating portion. The lower bearing portion includes a lower dynamic pressure generating groove defined in at least one of the lower outer circumferential surface and the lower inner circumferential surface, and configured to induce a dynamic pressure during the rotation of the rotating portion. Both the upper bearing portion and the lower bearing portion are filled with the lubricating fluid. A radial distance between a lower end portion of the upper dynamic pressure generating groove and the central axis is shorter than a radial distance between an upper end portion of the lower dynamic pressure generating groove and the central axis.

According to the above preferred embodiment of the present invention, a reduction in friction loss at the upper bearing portion is achieved by arranging the lower end portion of the upper dynamic pressure generating groove radially inward of the upper end portion of the lower dynamic pressure generating groove. Accordingly, a magnitude of a drive current needed to obtain a desired rotation rate is significantly reduced.

A spindle motor according to another preferred embodiment of the present invention includes a stationary portion, a rotating portion, and a lubricating fluid. The rotating portion is rotatable about a central axis extending in a vertical direction. The lubricating fluid is provided between the stationary portion and the rotating portion. The stationary portion includes a base, a stator, a shaft portion, and a magnetic member. The stator includes a plurality of coils having an annular or substantially annular shape with the central axis as a center. The shaft portion extends along the central axis, and includes a lower end portion fixed to the base. The magnetic member is located on an upper surface of the base. The shaft portion includes an upper outer circumferential surface and a lower outer circumferential surface. The upper outer circumferential surface is inclined with respect to the central axis. The lower outer circumferential surface is inclined with respect to the central axis, and is located below the upper outer circumferential surface. A radial distance between the upper outer circumferential surface and the central axis decreases with decreasing height. A radial distance between the lower outer circumferential surface and the central axis decreases with increasing height. The rotating portion includes a sleeve and a magnet. The sleeve is tubular, and includes a central through hole through which the shaft portion is inserted. The magnet is opposite to the stator with a gap intervening therebetween, and is located above the magnetic member. The sleeve includes an upper inner circumferential surface and a lower inner circumferential surface. The upper inner circumferential surface is opposite to the upper outer circumferential surface, and is inclined with respect to the central axis. The lower inner circumferential surface is opposite to the lower outer circumferential surface below the upper inner circumferential surface, and is inclined with respect to the central axis. A radial distance between the upper inner circumferential surface and the central axis decreases with decreasing height. A radial distance between the lower inner circumferential surface and the central axis decreases with increasing height. The shaft portion, the sleeve, and the lubricating fluid together define a fluid dynamic bearing. The fluid dynamic bearing includes an upper bearing portion and a lower bearing portion. The upper bearing portion includes an upper dynamic pressure generating groove defined in at least one of the upper outer circumferential surface and the upper inner circumferential surface, and configured to induce a dynamic pressure during rotation of the rotating portion. The lower bearing portion includes a lower dynamic pressure generating groove defined in at least one of the lower outer circumferential surface and the lower inner circumferential surface, and configured to induce a dynamic pressure during the rotation of the rotating portion. Both the upper bearing portion and the lower bearing portion are filled with the lubricating fluid. The following relationships are satisfied: $Sw<Su$, and $W\times\{1-(Sw/Su)\times 4\}<B<1176$, where W is a weight of the rotating portion, Sw is an area of the upper bearing portion projected on a plane perpendicular to the central axis, Su is an area of the lower bearing portion projected on the plane perpendicular to the central axis, and B is a magnitude of an axial component of a magnetic attraction force between the magnetic member and the magnet.

According to the above preferred embodiment of the present invention, a significant reduction in friction loss at the upper bearing portion is achieved because the projected area Sw of the upper bearing portion is smaller than the projected area Su of the lower bearing portion. Accordingly, a magnitude of a drive current needed to obtain a desired rotation rate is significantly reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a spindle motor is referred to by the term "axial direction", "axial", or "axially", that directions perpendicular or substantially perpendicular to the central axis of the spindle motor are each referred to by the term "radial direction", "radial", or "radially", and that a direction along a circular arc centered on the central axis of the spindle motor is referred to by the term "circumferential direction", "circumferential", or "circumferentially". It is also assumed herein that a vertical direction is the axial direction, and that a side on which a sleeve is arranged with respect to a base is defined as an upper side. The shape of each member or portion and relative positions of different members or portions will be described based on the above assumptions. It should be noted, however, that the above definitions of the vertical direction and the upper and lower sides are not meant to restrict in any way the orientation of a spindle motor or a disk drive apparatus according to any preferred embodiment of the present invention when in use.

Also note that the wording "parallel" as used herein comprehends parallel and substantially parallel directions. Also note that the wording "perpendicular" as used herein comprehends perpendicular and substantially perpendicular directions.

Figure 1:
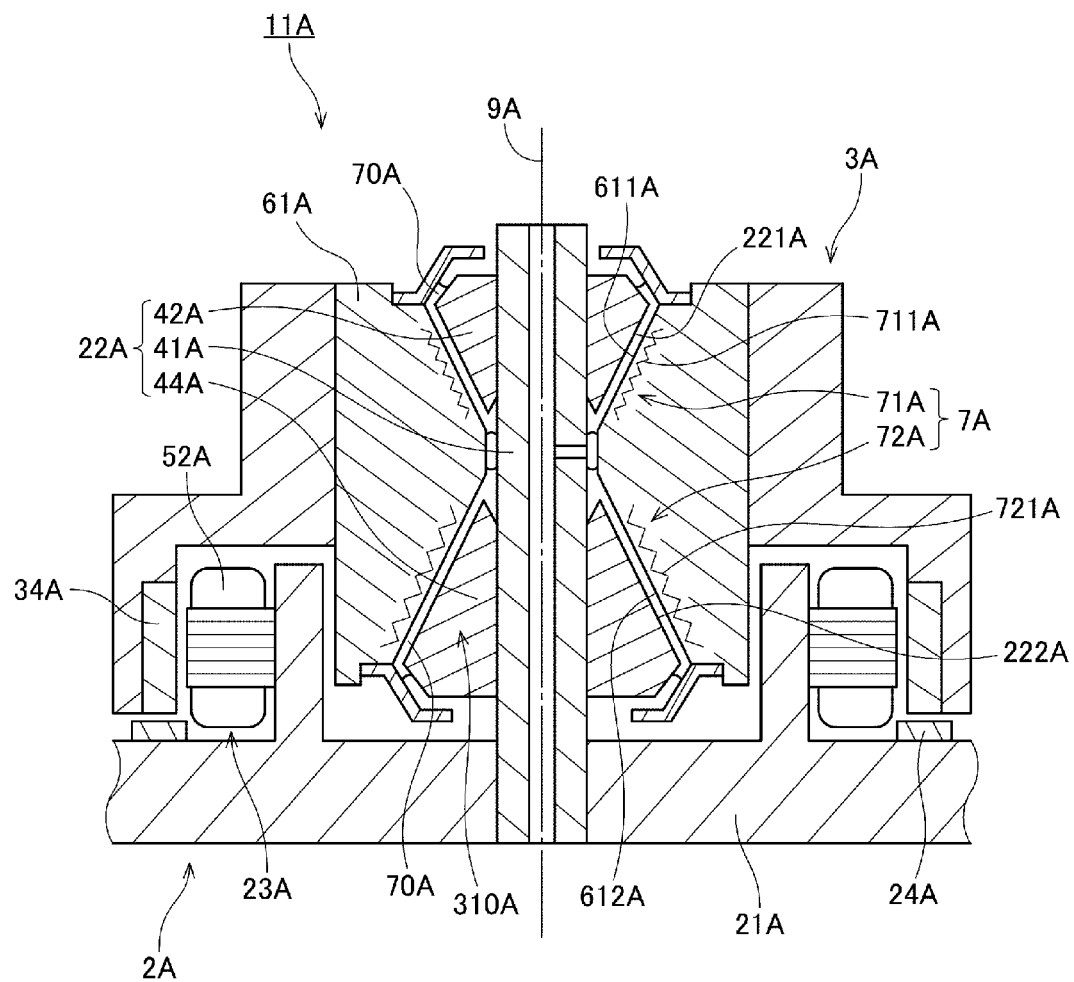
FIG. 1 is a schematic cross-sectional view of a spindle motor according to a first preferred embodiment of the present invention.

FIG. 1 is a schematic cross-sectional view of a spindle motor 11A according to a first preferred embodiment of the present invention. Referring to FIG. 1, the spindle motor 11A includes a stationary portion 2A, a rotating portion 3A that is rotatable about a central axis 9A, and a lubricating fluid 70A. The lubricating fluid 70A is provided between the stationary portion 2A and the rotating portion 3A.

The stationary portion 2A preferably includes a base 21A, a shaft portion 22A, a stator 23A, and a magnetic member 24A. The stator 23A preferably includes a plurality of coils 52A. The coils 52A preferably have an annular or substantially annular shape with the central axis 9A as a center. The magnetic member 24A is located on an upper surface of the base 21A.

The shaft portion 22A preferably includes a shaft body 41A, an upper cone 42A, and a lower cone 44A. In the present preferred embodiment, the shaft body 41A, the upper cone 42A, and the lower cone 44A are preferably defined by separate members. The shaft body 41A extends along the central axis 9A. A lower end portion of the shaft body 41A is fixed to the base 21A.

The upper cone 42A preferably includes an upper outer circumferential surface 221A inclined with respect to the central axis 9A. The radial distance between the upper outer circumferential surface 221A and the central axis 9A decreases with decreasing height. The lower cone 44A preferably includes a lower outer circumferential surface 222A inclined with respect to the central axis 9A. The lower outer circumferential surface 222A is located below the upper outer circumferential surface 221A. The radial distance between the lower outer circumferential surface 222A and the central axis 9A decreases with increasing height.

The rotating portion 3A includes a tubular sleeve 61A and a magnet 34A. The sleeve 61A preferably includes a central through hole 310A through which the shaft portion 22A is inserted. The magnet 34A is opposite to the stator 23A with a gap intervening therebetween, and is located above the magnetic member 24A. An axial magnetic attraction force is produced between the magnetic member 24A and the magnet 34A.

The sleeve 61A preferably includes an upper inner circumferential surface 611A and a lower inner circumferential surface 612A. The upper inner circumferential surface 611A is opposite to the upper outer circumferential surface 221A, and is inclined with respect to the central axis 9A. The radial distance between the upper inner circumferential surface 611A and the central axis 9A decreases with decreasing height. The lower inner circumferential surface 612A is located below the upper inner circumferential surface 611A. The lower inner circumferential surface 612A is opposite to the lower outer circumferential surface 222A, and is inclined with respect to the central axis 9A. The radial distance between the lower inner circumferential surface 612A and the central axis 9A decreases with increasing height.

In the present preferred embodiment, the shaft portion 22A, the sleeve 61A, and the lubricating fluid 70A together define a fluid dynamic bearing 7A. The fluid dynamic bearing 7A includes an upper bearing portion 71A and a lower bearing portion 72A. Both the upper bearing portion 71A and the lower bearing portion 72A are filled with the lubricating fluid 70A. The upper bearing portion 71A preferably includes an upper dynamic pressure generating groove array 711A defined in at least one of the upper outer circumferential surface 221A and the upper inner circumferential surface 611A. The upper dynamic pressure generating groove array 711A is configured to induce a dynamic pressure in the lubricating fluid 70A while the spindle motor 11A is running. The lower bearing portion 72A preferably includes a lower dynamic pressure generating groove array 721A defined in at least one of the lower outer circumferential surface 222A and the lower inner circumferential surface 612A. The lower dynamic pressure generating groove array 721A is configured to induce a dynamic pressure in the lubricating fluid 70A while the spindle motor 11A is running.

In this spindle motor 11A, the radial distance between a lower end portion of the upper dynamic pressure generating groove array 711A and the central axis 9A preferably is shorter than the radial distance between an upper end portion of the lower dynamic pressure generating groove array 721A and the central axis 9A. A reduction in friction loss at the upper bearing portion 71A is achieved by locating the lower end portion of the upper dynamic pressure generating groove array 711A radially inward of the upper end portion of the lower dynamic pressure generating groove array 721A. This reduces a magnitude of a drive current needed to obtain a desired rotation rate. In addition, although an upward dynamic pressure generated in the lower bearing portion 72A is greater than a downward dynamic pressure generated in the upper bearing portion 71A, the rotating portion 3A is drawn downward by the magnetic attraction force between the magnetic member 24A and the magnet 34A. This results in stable rotation of the spindle motor 11A.

Note that, in place of, or in addition to, the above-described condition, "the radial distance between the lower end portion of the upper dynamic pressure generating groove array 711A and the central axis 9A is shorter than the radial distance between the upper end portion of the lower dynamic pressure generating groove array 721A and the central axis 9A", it may be configured such that the following relationship is satisfied:

$Sw < Su$ and $W \times \{1-(Sw/Su) \times 4\} < B < 1176,$ where W is the weight of the rotating portion 3A, Sw is an area of the upper bearing portion 71A projected on a plane perpendicular to the central axis 9A, Su is an area of the lower bearing portion 72A projected on the plane perpendicular to the central axis 9A, and B is the magnitude of an axial component of the magnetic attraction force between the magnetic member 24A and the magnet 34A.

Figure 2:
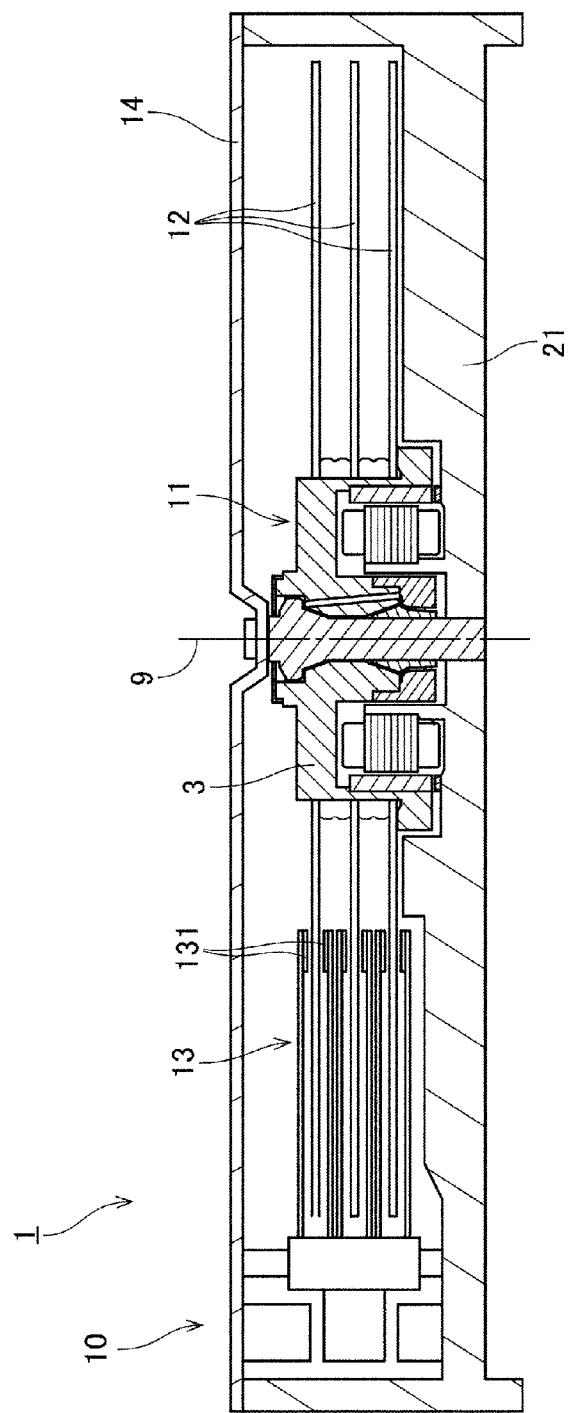
FIG. 2 is a schematic cross-sectional view of a disk drive apparatus according to a second preferred embodiment of the present invention.

FIG. 2 is a schematic cross-sectional view of a disk drive apparatus 1 in which a spindle motor 11 according to a second preferred embodiment of the present invention is installed. This disk drive apparatus 1 is configured to rotate magnetic disks 12 and perform reading and writing of information from or to the magnetic disks 12. Referring to FIG. 2, the disk drive apparatus 1 includes the spindle motor 11, the magnetic disks 12, which are preferably three in number, for example, an access portion 13, and a cover 14.

The spindle motor 11 is configured to rotate the three magnetic disks 12 about a central axis 9 while supporting the magnetic disks 12. The spindle motor 11 includes a base 21 extending perpendicularly to the central axis 9. An upper portion of the base 21 is covered with the cover 14. A rotating portion 3 of the spindle motor 11, the three magnetic disks 12, and the access portion 13 are accommodated in a case 10 defined by the base 21 and the cover 14. The access portion 13 is configured to move heads 131 along recording surfaces of the magnetic disks 12 to perform the reading and the writing of information from or to the magnetic disks 12.

Note that the number of magnetic disks included in the disk drive apparatus 1 may be one, two, or more than three, for example. Also note that the access portion 13 may be configured to perform only one of the reading and the writing of information from or to the magnetic disks 12 if so desired.

An interior space of the case 10 is preferably a clean space with no, or only an extremely small amount of, dirt and/or dust. In the present preferred embodiment, the interior space of the case 10 is preferably filled with clean air. Note, however, that the interior space of the case 10 may alternatively be filled with a helium gas, a hydrogen gas, or a nitrogen gas, instead of air, if so desired. Also note that the interior space of the case 10 may be filled with a mixture of at least one of these gases and air.

Figure 3:
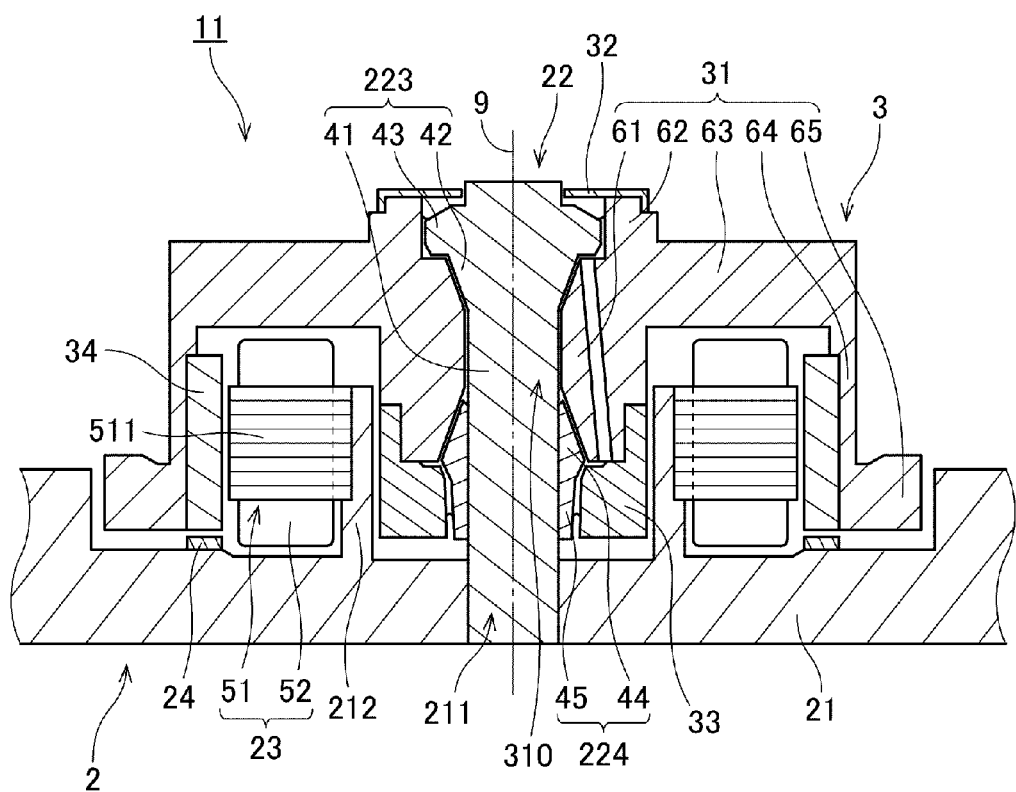
FIG. 3 is a schematic cross-sectional view of a spindle motor according to the second preferred embodiment of the present invention.
Figure 4:
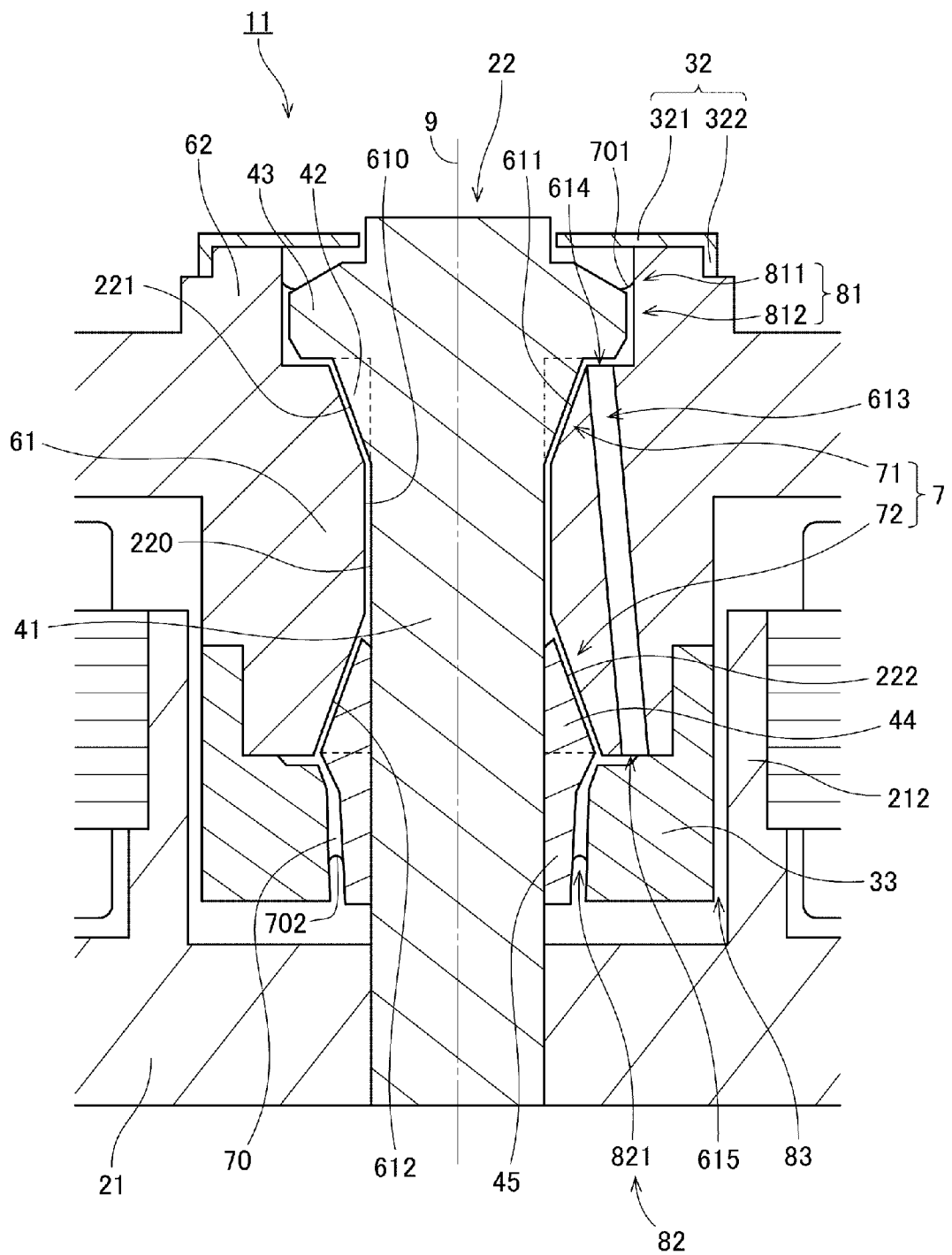
FIG. 4 is a schematic cross-sectional view of a portion of the spindle motor according to the second preferred embodiment of the present invention.

Next, the structure of the spindle motor 11 will be described in more detail below. FIG. 3 is a schematic cross-sectional view of the spindle motor 11. FIG. 4 is a schematic cross-sectional view of a portion of the spindle motor 11 in the vicinity of a fluid dynamic bearing 7. Referring to FIG. 3, the spindle motor 11 includes a stationary portion 2 and the rotating portion 3. The stationary portion 2 is stationary relative to the base 21 and the cover 14. The rotating portion 3 is supported to be rotatable with respect to the stationary portion 2.

The stationary portion 2 according to the present preferred embodiment preferably includes the base 21, a shaft portion 22, a stator 23, and a magnetic member 24.

The base 21 extends perpendicularly to the central axis 9 below the stator 23, the rotating portion 3, the magnetic disks 12, and the access portion 13. A metal, such as an aluminum alloy, for example, is preferably used as a material of the base

21. Referring to FIG. 3, the base 21 preferably includes a shaft fixing hole 211 at a position overlapping with the central axis 9. In addition, the base 21 includes an annular projection 212, which is cylindrical or substantially cylindrical. The annular projection 212 is preferably arranged to project upward radially inside the stator 23 and radially outside an annular member 33 described below.

The shaft portion 22 preferably includes a shaft body 41, an upper cone 42, which is conical or substantially conical, an upper seal projection 43, a lower cone 44, which is conical or substantially conical, and a lower seal projection 45. The shaft body 41 extends along the central axis 9, and overlaps with the central axis 9 in a plan view. A lower end portion of the shaft body 41 is inserted in the shaft fixing hole 211 of the base 21, and is fixed to the base 21. Meanwhile, referring to FIG. 2, an upper end portion of the shaft body 41 is preferably fixed to the cover 14 of the disk drive apparatus 1. In addition, referring to FIG. 4, the shaft body 41 includes a middle outer circumferential surface 220 located below the upper cone 42 and above the lower cone 44.

The upper cone 42 projects radially outward from the shaft body 41. The upper cone 42 is preferably annular and conical, for example. The upper cone 42 preferably includes an upper outer circumferential surface 221 inclined with respect to the central axis 9. The radial distance between the upper outer circumferential surface 221 and the central axis 9 decreases with decreasing height. The upper seal projection 43 is located above both the upper cone 42 and a sleeve 61 described below. The upper seal projection 43 is preferably annular and plate-shaped, for example. The upper seal projection 43 according to the present preferred embodiment projects radially outward relative to an upper end portion of the upper cone 42. Note that, in FIG. 4, a boundary between the upper cone 42 and the shaft body 41 and a boundary between the upper cone 42 and the upper seal projection 43 are represented by a broken line.

The lower cone 44 is located below and axially spaced from the upper cone 42. The lower cone 44 is preferably annular and conical, for example. The lower cone 44 preferably includes a lower outer circumferential surface 222 inclined with respect to the central axis 9. The lower outer circumferential surface 222 is located below the upper outer circumferential surface 221. The radial distance between the lower outer circumferential surface 222 and the central axis 9 decreases with increasing height. The lower seal projection 45 is located below both the lower cone 44 and the sleeve 61 described below and above the base 21. The lower seal projection 45 is preferably annular, for example. The lower seal projection 45 according to the present preferred embodiment projects downward from a lower end portion of the lower cone 44 to assume a cylindrical or substantially cylindrical shape, for example. Note that, in FIG. 4, a boundary between the lower cone 44 and the lower seal projection 45 is represented by a broken line.

In the present preferred embodiment, the shaft body 41, the upper cone 42, and the upper seal projection 43 are preferably monolithically defined by a single first member 223. Meanwhile, in the present preferred embodiment, the lower cone 44 and the lower seal projection 45 are preferably monolithically defined by a single second member 224, which is different from the first member 223. A metal, such as stainless steel, for example, is preferably used as a material of each of the first member 223 and the second member 224. The second member 224 is fixed to an outer circumferential surface of the shaft body 41 through press fit, shrink fit, an adhesive, or the like.

The stator 23 preferably includes a stator core 51 and a plurality of coils 52. The stator core 51 is defined, for example, by laminated steel sheets, i.e., electromagnetic steel sheets, such as, for example, silicon steel sheets, placed one upon another in the axial direction. The stator core 51 is fixed to an outer circumferential surface of the annular projection 212. In addition, the stator core 51 includes a plurality of teeth 511 projecting radially outward. Each coil 52 is preferably defined by a conducting wire wound around a separate one of the teeth 511. The teeth 511 and the coils 52 preferably have an annular or substantially annular shape with the central axis 9 as a center.

The magnetic member 24 is annular, and is defined by an unpolarized ferromagnetic body. The magnetic member 24 is located below a magnet 34 described below, and is located on an upper surface of the base 21. An axial magnetic attraction force is produced between the magnetic member 24 and the magnet 34. The rotating portion 3 is thus drawn downward. In the present preferred embodiment, the magnet 34 and the magnetic member 24 axially overlap with each other. Note, however, that the magnet 34 and the magnetic member 24 may not necessarily axially overlap with each other if so desired. It is enough that a magnetic attraction force produced between the magnet 34 and the magnetic member 24 has an axial component.

The rotating portion 3 according to the present preferred embodiment preferably includes a hub 31, a cap 32, the annular member 33, and the magnet 34.

The hub 31 is supported to be rotatable about the central axis 9 around the shaft portion 22. A metal, such as stainless steel, for example, is preferably used as a material of the hub 31. The hub 31 according to the present preferred embodiment preferably includes the sleeve 61, a hub raised portion 62, a top plate portion 63, an outer cylindrical portion 64, and a flange portion 65.

The sleeve 61 extends in the axial direction to assume a tubular shape around the shaft portion 22. The hub raised portion 62 is projects upward to assume an annular shape radially outside the upper seal projection 43 and above the sleeve 61. The top plate portion 63 extends radially outward from the sleeve 61. The outer cylindrical portion 64 extends downward from a radially outer edge portion of the top plate portion 63 to assume a cylindrical or substantially cylindrical shape. The flange portion 65 projects further radially outward from a lower end portion of the outer cylindrical portion 64.

The sleeve 61 includes a central through hole 310 through which the shaft body 41 is inserted. In addition, the sleeve 61 includes a middle inner circumferential surface 610, which is cylindrical or substantially cylindrical, an upper inner circumferential surface 611 located above the middle inner circumferential surface 610, and a lower inner circumferential surface 612 located below the middle inner circumferential surface 610. Both the upper inner circumferential surface 611 and the lower inner circumferential surface 612 are inclined with respect to the central axis 9. Specifically, the radial distance between the upper inner circumferential surface 611 and the central axis 9 decreases with decreasing height, while the radial distance between the lower inner circumferential surface 612 and the central axis 9 decreases with increasing height.

The middle outer circumferential surface 220 of the shaft portion 22 and the middle inner circumferential surface 610 of the sleeve 61 are radially opposite to each other. The upper outer circumferential surface 221 of the shaft portion 22 and the upper inner circumferential surface 611 of the sleeve 61 are obliquely radially opposite to each other. The lower outer circumferential surface 222 of the shaft portion 22 and the lower inner circumferential surface 612 of the sleeve 61 are obliquely radially opposite to each other.

A lower surface of the lowest one of the magnetic disks 12 is in contact with at least a portion of an upper surface of the flange portion 65. As a result, the magnetic disks 12 are axially positioned. In addition, an inner circumferential portion of each magnetic disk 12 is in contact with at least a portion of an outer circumferential surface of the outer cylindrical portion 64. Each magnetic disk 12 is thus radially positioned. As described above, in the present preferred embodiment, the outer cylindrical portion 64 and the flange portion 65 together define a support portion to support the magnetic disks 12.

The hub 31 according to the present preferred embodiment is preferably defined by a single monolithic member, for example. Note, however, that the hub 31 may be defined by a plurality of separate members if so desired. For example, the hub 31 may be defined by two members: a member including the sleeve 61 and the hub raised portion 62, and a member including the top plate portion 63, the outer cylindrical portion 64, and the flange portion 65.

The cap 32 preferably is a disk-shaped or substantially disk-shaped member including a circular or substantially circular hole at a center thereof. A material of the cap 32 may be either a metal or a resin. The cap 32 according to the present preferred embodiment preferably includes a cap plate portion 321 and a cap raised portion 322. The cap plate portion 321 extends above the hub raised portion 62 and the upper seal projection 43 to assume an annular or substantially annular shape. An inner circumferential portion of the cap plate portion 321 is radially opposite to the outer circumferential surface of the shaft portion 22 in the vicinity of an upper end portion of the shaft portion 22 with a slight gap intervening therebetween. The cap raised portion 322 preferably projects downward from a radially outer end portion of the cap plate portion 321 to assume a cylindrical or substantially cylindrical shape. Both a lower surface of the cap plate portion 321 and an inner circumferential surface of the cap raised portion 322 are preferably fixed to the hub raised portion 62 through, for example, an adhesive. Once the hub 31 is caused to rotate, the cap 32 is also caused to rotate together with the hub 31.

The annular member 33 is located below the sleeve 61, and extends in an annular or substantially annular shape to surround the lower seal projection 45. In the present preferred embodiment, the hub 32 and the annular member 33 are preferably defined by separate members. A metal, such as stainless steel, or a resin, for example, is preferably used as a material of the annular member 33. The annular member 33 is preferably fixed to the sleeve 61 through, for example, an adhesive.

The magnet 34 is located radially outside the stator 23 and above the magnetic member 24. The magnet 34 is fixed to an inner circumferential surface of the outer cylindrical portion 64. In the present preferred embodiment, the magnet 34 preferably is annular or substantially annular, for example. An inner circumferential surface of the magnet 34 is radially opposite to a radially outer end surface of each of the teeth 511 with a gap intervening therebetween. In addition, north and south poles are arranged alternately in a circumferential direction on the inner circumferential surface of the magnet 34.

Note that a plurality of magnets may be used in place of the annular magnet 34 if so desired. In the case where the plurality of magnets are used, the magnets are arranged in the circumferential direction such that north and south poles alternate with each other.

Once electrical drive currents are supplied to the coils 52 in the spindle motor 11 described above, magnetic flux is generated around each of the teeth 511. Then, interaction between the magnetic flux of the teeth 511 and that of the magnet 34 produces a circumferential torque between the stationary portion 2 and the rotating portion 3, so that the rotating portion 3 is caused to rotate about the central axis 9 with respect to the stationary portion 2. The magnetic disks 12 supported by the hub 31 are caused to rotate about the central axis 9 together with the rotating portion 3.

Next, the structure of the fluid dynamic bearing 7 included in the spindle motor 11 will be described below. Referring to FIG. 4, a lubricating fluid 70 is provided between the shaft portion 22 and each of the sleeve 61 and the annular member 33. A polyolester oil or a diester oil, for example, is preferably used as the lubricating fluid 70. The sleeve 61 and the annular member 33 are supported to be rotatable with respect to the shaft portion 22 through the lubricating fluid 70.

Figure 5:
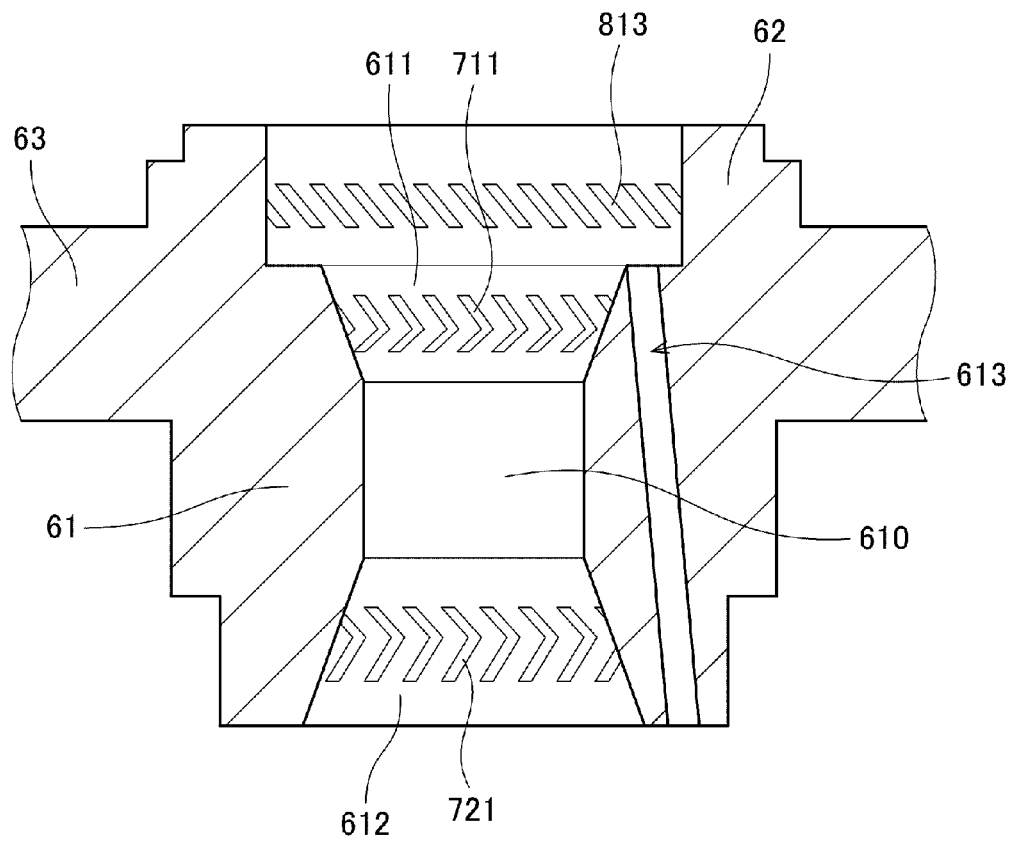
FIG. 5 is a schematic cross-sectional view of a sleeve according to the second preferred embodiment of the present invention.

FIG. 5 is a schematic cross-sectional view of the sleeve 61. Referring to FIG. 5, the sleeve 61 preferably includes, in the upper inner circumferential surface 611 thereof, an upper dynamic pressure generating groove array 711 arranged in a herringbone pattern. In addition, the sleeve 61 preferably includes, in the lower inner circumferential surface 612 thereof, a lower dynamic pressure generating groove array 721 arranged in a herringbone pattern. The sleeve 61 is configured to rotate in one direction with respect to the shaft portion 22 while the spindle motor 11 is running. At this time, each of the upper dynamic pressure generating groove array 711 and the lower dynamic pressure generating groove array 721 induces a dynamic pressure in a portion of the lubricating fluid 70 which is present between the shaft portion 22 and the sleeve 61. The sleeve 61 is supported by this dynamic pressure both radially and axially with respect to the shaft portion 22.

That is, in the present preferred embodiment, an upper bearing portion 71 is defined by the upper outer circumferential surface 221, which is a bearing surface on the portion of the stationary portion 2, the upper inner circumferential surface 611, which is a bearing surface on the portion of the rotating portion 3, and a portion of the lubricating fluid 70 which fills a gap therebetween. Meanwhile, a lower bearing portion 72 is defined by the lower outer circumferential surface 222, which is a bearing surface on a portion of the stationary portion 2, the lower inner circumferential surface 612, which is a bearing surface on the portion of the rotating portion 3, and a portion of the lubricating fluid 70 which fills a gap therebetween. Then, the fluid dynamic bearing 7 is defined by a combination of the upper bearing portion 71 and the lower bearing portion 72.

The dynamic pressure applied to the sleeve 61 in the upper bearing portion 71 while the spindle motor 11 is running includes a radially outward component and an axially downward component. Meanwhile, the dynamic pressure applied to the sleeve 61 in the lower bearing portion 72 while the spindle motor 11 is running includes a radially outward component and an axial upward component.

Note that it is enough that the upper dynamic pressure generating groove array 711 is defined in at least one of the upper outer circumferential surface 221 and the upper inner circumferential surface 611. Also note that it is enough that the lower dynamic pressure generating groove array 721 is defined in at least one of the lower outer circumferential surface 222 and the lower inner circumferential surface 612.

The lubricating fluid 70 has an upper liquid surface 701 and a lower liquid surface 702. The upper liquid surface 701 is located between the upper seal projection 43 and the hub raised portion 62 above the upper bearing portion 71. That is, in the present preferred embodiment, an outer circumferential surface of the upper seal projection 43 and an inner circumferential surface of the hub raised portion 62 preferably together define an upper seal portion 81 configured to hold the upper liquid surface 701. Meanwhile, the lower liquid surface 702 is located between the lower seal projection 45 and the annular member 33 below the lower bearing portion 72. That is, in the present preferred embodiment, an outer circumferential surface of the lower seal projection 45 and an inner circumferential surface of the annular member 33 preferably together define a lower seal portion 82 configured to hold the lower liquid surface 702.

The upper seal portion 81 according to the present preferred embodiment preferably includes an upper capillary seal portion 811 and a pumping seal portion 812. The upper bearing portion 71 and the upper capillary seal portion 811 are in communication with each other. In the upper capillary seal portion 811, the radial distance between the outer circumferential surface of the upper seal projection 43 and the inner circumferential surface of the hub raised portion 62 increases with increasing height. The upper liquid surface 701 of the lubricating fluid 70 is accordingly attracted downward by surface tension to define a meniscus. This reduces the likelihood that the lubricating fluid 70 will leak through the upper seal portion 81.

The pumping seal portion 812 is located below the upper capillary seal portion 811, i.e., closer to the upper bearing portion 71 than is the upper capillary seal portion 811. Referring to FIG. 5, the hub 31 preferably includes a pumping groove array 813 arranged in a spiral pattern in the inner circumferential surface of the hub raised portion 62. The hub 31 is configured to rotate in one direction with respect to the shaft portion 22 while the spindle motor 11 is running. The pumping groove array 813 is configured to press a portion of the lubricating fluid 70 which is located between the upper seal projection 43 and the hub raised portion 62 toward the upper bearing portion 71 at this time. This further reduces the likelihood that the lubricating fluid 70 will leak through the upper seal portion 81.

Note that it is enough that the pumping groove array 813 is defined in at least one of the outer circumferential surface of the upper seal projection 43 and the inner circumferential surface of the hub raised portion 62 which together define the pumping seal portion 812. Also note that the pumping groove array 813 may alternatively be a groove array arranged in a herringbone pattern if so desired.

The lower seal portion 82 according to the present preferred embodiment preferably includes a lower capillary seal portion 821. The lower bearing portion 72 and the lower capillary seal portion 821 are in communication with each other. In the lower capillary seal portion 821, the radial distance between the outer circumferential surface of the lower seal projection 45 and the inner circumferential surface of the annular member 33 increases with decreasing height. The lower liquid surface 702 of the lubricating fluid 70 is accordingly attracted upward by surface tension to define a meniscus. This reduces the likelihood that the lubricating fluid 70 will leak through the lower seal portion 82.

A flow of the lubricating fluid 70 caused by the pumping seal portion 812 may cause an air bubble to be introduced into the lubricating fluid 70 through the upper seal portion 81. The air bubble will travel to the lower seal portion 82 through an upper opening 614, a communicating hole 613, and a lower opening 615, which will be described below. The air bubble is then discharged to an outside through the lower capillary seal portion 821.

In the present preferred embodiment, the radial distance between the outer circumferential surface of the lower seal projection 45 and the central axis 9 decreases with decreasing height. In addition, the radial distance between the inner circumferential surface of the annular member 33 and the central axis 9 decreases with decreasing height. Moreover, an angle of the outer circumferential surface of the lower seal projection 45 with the central axis 9 is preferably greater than an angle of the inner circumferential surface of the annular member 33 with the central axis 9. Therefore, while the spindle motor 11 is rotating, a centrifugal force acting in the direction of the lower bearing portion 72 is applied to the lower capillary seal portion 821. This further reduces the likelihood that the lubricating fluid 70 will leak through the lower seal portion 82.

The sleeve 61 preferably includes the communicating hole 613 independently of the central through hole 310. The communicating hole 613 is located radially outward of the central through hole 310, and passes through the sleeve 61 from an upper surface to a lower surface of the sleeve 61. The communicating hole 613 axially joins the upper opening 614, which is defined in the upper surface of the sleeve 61, and the lower opening 615, which is defined in the lower surface of the sleeve 61, to each other. An interior of the communicating hole 613 is also filed with the lubricating fluid 70.

The lubricating fluid 70 continuously fills a gap extending from the upper seal portion 81 to the lower seal portion 82 through the communicating hole 613 and a gap between the shaft portion 22 and the sleeve 61. Therefore, the lubricating fluid 70 includes only two liquid surfaces, the liquid surface 701 held by the upper seal portion 81 and the liquid surface 702 held by the lower seal portion 82. This contributes to reducing evaporation of the lubricating fluid 70.

In the present preferred embodiment, the upper opening 614 of the communicating hole 613 is preferably located radially inward of the lower opening 615 of the communicating hole 613. In addition, the communicating hole 613 extends in a straight line from the upper opening 614 to the lower opening 615. A circulation channel of the lubricating fluid 70 is thus shortened compared to the case where the upper opening 614 of the communicating hole 613 is located right above the lower opening 615 of the communicating hole 613. That is, an area where the lubricating fluid 70 intervenes between the stationary portion 2 and the rotating portion 3 is significantly reduced. This leads to an additional reduction in frictional resistance of the whole fluid dynamic bearing 7.

In the present preferred embodiment, the lower capillary seal portion 821 is preferably located radially inward of the upper capillary seal portion 811. In addition, the lower capillary seal portion 821 is located radially inward of the lower opening 615 of the communicating hole 613. Accordingly, an air bubble which has been introduced into the lubricating fluid 70 through the upper capillary seal portion 811 and flowed into the communicating hole 613 travels smoothly from the lower opening 615 to the lower capillary seal portion 821. This promotes discharge of the air bubble through the lower capillary seal portion 821.

The fluid dynamic bearing 7 according to the present preferred embodiment preferably includes the upper dynamic pressure generating groove array 711 and the lower dynamic pressure generating groove array 721 as described above. While the spindle motor 11 is running, a combined action of the upper dynamic pressure generating groove array 711 and the lower dynamic pressure generating groove array 721 causes a portion of the lubricating fluid 70 which is present between the outer circumferential surface of the shaft portion 22 and the inner circumferential surface of the sleeve 61 to flow upward.

An outer circumferential surface of the annular member 33 and an inner circumferential surface of the annular projection 212 of the base 21 are radially opposite to each other with a slight gap intervening therebetween. The radial distance between the outer circumferential surface of the annular member 33 and the inner circumferential surface of the annular projection 212 is shorter than a maximum radial distance between the outer circumferential surface of the lower seal projection 45 and the inner circumferential surface of the annular member 33 in the lower capillary seal portion 821. This reduces the likelihood that a gas will enter or exit through a gap between the annular member 33 and the annular projection 212. This in turn reduces evaporation of the lubricating fluid 70 through the lower seal portion 82. That is, the spindle motor 11 preferably includes a labyrinth seal portion 83 between the annular member 33 and the annular projection 212. The labyrinth seal portion 83 is located radially outward of the lower capillary seal portion 821.

Figure 6:
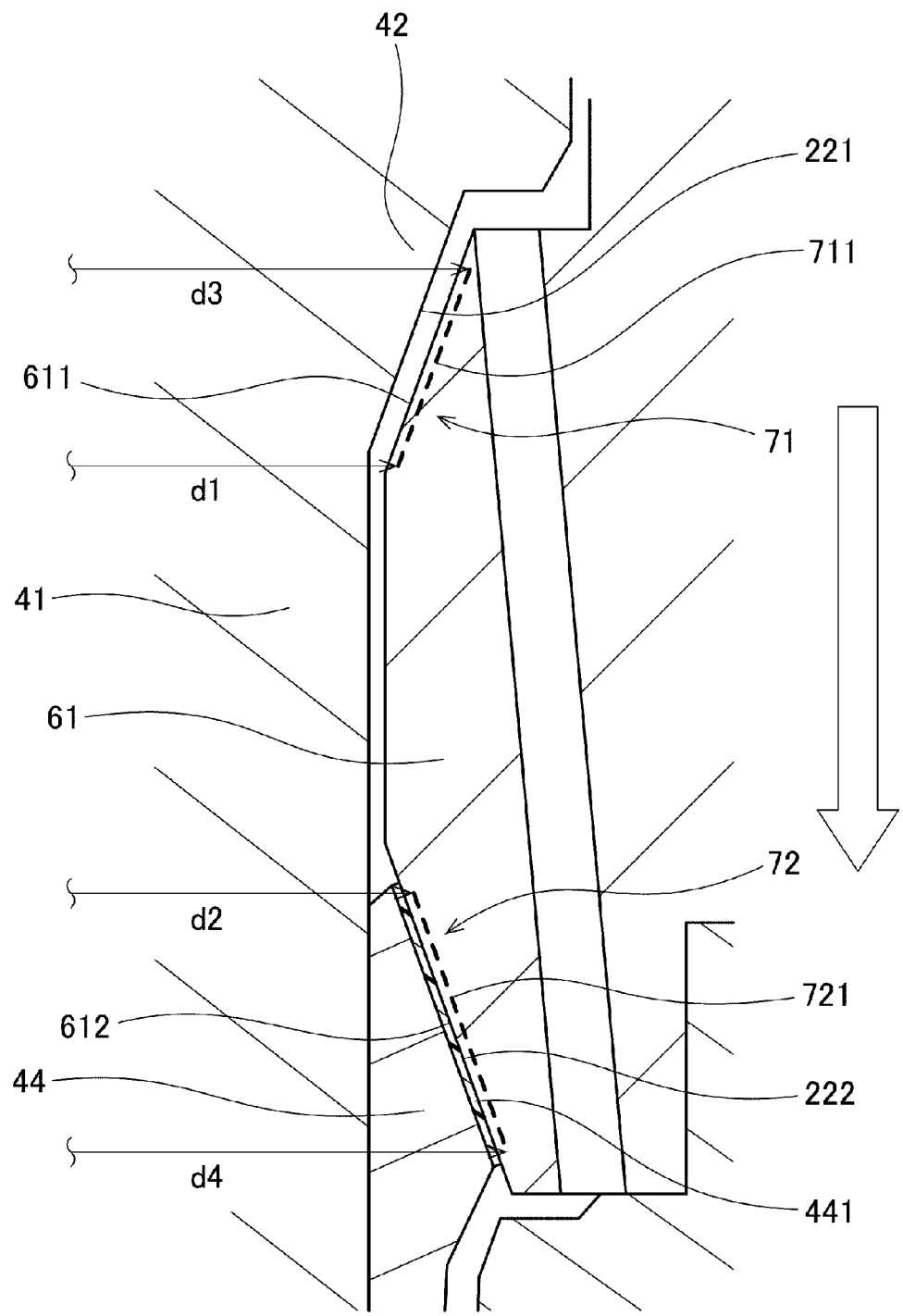
FIG. 6 is a schematic cross-sectional view of a portion of the spindle motor according to the second preferred embodiment of the present invention when the spindle motor is in a stopped state.

FIG. 6 is a schematic cross-sectional view of a portion of the spindle motor 11 when the spindle motor 11 is in a stopped state. When the spindle motor 11 is in the stopped state, the rotating portion 3 is attracted downward by the magnetic attraction force between the magnetic member 24 and the magnet 34 as indicated by an arrow outline with a blank inside in FIG. 6. As a result, the lower inner circumferential surface 612 of the sleeve 61 is brought into contact with the lower outer circumferential surface 222 of the lower cone 44 as illustrated in FIG. 6. The lower cone 44 preferably includes a protective film 441 that covers the lower outer circumferential surface 222. Diamond-like carbon (DLC), gilt, or molybdenum disulfide, for example, is preferably used as a material of the protective film 441. This reduces the likelihood that the lower outer circumferential surface 222 will be damaged by a contact with the sleeve 61. In the case where DLC is used as the material of the protective film 441, the protective film 441 preferably has a thickness of about 1 μm to about 3 μm, for example.

In FIG. 6, an area where the upper dynamic pressure generating groove array 711 is defined in the upper inner circumferential surface 611, and an area where the lower dynamic pressure generating groove array 721 is defined in the lower inner circumferential surface 612 are represented by bold broken lines. Referring to FIG. 6, in this spindle motor 11, the radial distance d1 between a lower end portion of the upper dynamic pressure generating groove array 711 and the central axis 9 is shorter than the radial distance d2 between an upper end portion of the lower dynamic pressure generating groove array 721 and the central axis 9. That is, the lower end portion of the upper dynamic pressure generating groove array 711 is located radially inward of the upper end portion of the lower dynamic pressure generating groove array 721.

A reduction in friction loss at the upper bearing portion 71 is achieved by locating the upper dynamic pressure generating groove array 711 radially inward as described above. Accordingly, a magnitude of a drive current needed to obtain a desired rotation rate is significantly reduced. According to the above-described structure, an upward dynamic pressure generated in the lower bearing portion 72 is greater than a downward dynamic pressure generated in the upper bearing portion 71. However, the rotating portion 3 is drawn downward by the magnetic attraction force between the magnetic member 24 and the magnet 34. As a result, an upward force and a downward force acting on the sleeve 61 are balanced while the spindle motor 11 is running. This enables the spindle motor 11 to rotate stably.

Note that, depending on the orientation of the spindle motor 11 when the spindle motor 11 is used, the distance between the upper outer circumferential surface 221 and the upper inner circumferential surface 611, and the distance between the lower outer circumferential surface 222 and the lower inner circumferential surface 612 may be modified to some degree. For example, in the case where the spindle motor 11 is driven with the base 21 arranged downward in a vertical direction, the axial distance between the upper outer circumferential surface 221 and the upper inner circumferential surface 611 is, for example, in the range of about 7 μm to about 8 μm, while the axial distance between the lower outer circumferential surface 222 and the lower inner circumferential surface 612 is, for example, in the range of about 6 μm to about 7 μm. On the other hand, in the case where the spindle motor 11 is driven with the base 21 located upward in the vertical direction, the axial distance between the upper outer circumferential surface 221 and the upper inner circumferential surface 611 is, for example, in the range of about 6 μm to about 7 μm, while the axial distance between the lower outer circumferential surface 222 and the lower inner circumferential surface 612 is, for example, in the range of about 7 μm to about 8 μm.

In addition, referring to FIG. 6, in the present preferred embodiment, the radial distance d3 between an upper end portion of the upper dynamic pressure generating groove array 711 and the central axis 9 is shorter than the radial distance d4 between a lower end portion of the lower dynamic pressure generating groove array 721 and the central axis 9. That is, the upper end portion of the upper dynamic pressure generating groove array 711 is located radially inward of the lower end portion of the lower dynamic pressure generating groove array 721. An additional reduction in the friction loss at the upper bearing portion 71 is thus achieved. Accordingly, the magnitude of the drive current needed to obtain the desired rotation rate is further reduced.

Figure 7:
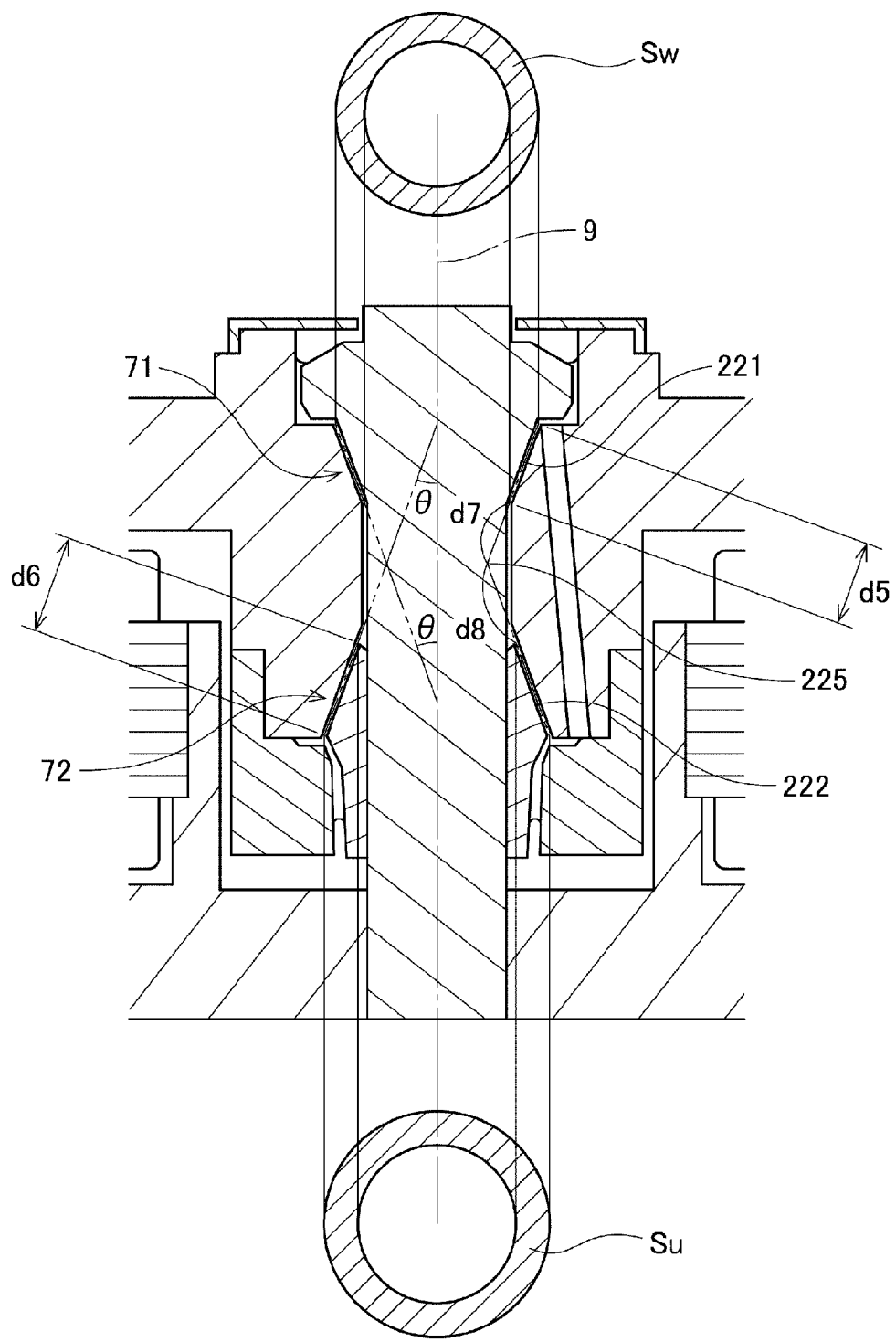
FIG. 7 is a diagram illustrating measurements and angles of some portions of a fluid dynamic bearing according to the second preferred embodiment of the present invention.

FIG. 7 is a diagram illustrating measurements and angles of some portions of the fluid dynamic bearing 7. Referring to FIG. 7, in the present preferred embodiment, in a section including the central axis 9, the length d5 of the upper bearing portion 71 is equal to or smaller than the length d6 of the lower bearing portion 72. Here, the length d5 of the upper bearing portion 71 refers to the length of an area where the upper dynamic pressure generating groove array 711 is provided, whereas the length d6 of the lower bearing portion 72 refers to the length of an area where the lower dynamic pressure generating groove array 721 is provided. The length d5 of the upper bearing portion 71 is, for example, in the range of about 1.2 mm to about 2.0 mm. The length d6 of the lower bearing portion 72 is, for example, in the range of about 1.7 mm to about 1.9 mm. An additional reduction in the friction loss at the upper bearing portion 71 is achieved by setting the length d5 of the upper bearing portion 71 to be equal to or smaller than the length d6 of the lower bearing portion 72 as described above. Accordingly, the magnitude of the drive current needed to obtain the desired rotation rate is further reduced.

In addition, referring to FIG. 7, it is assumed that Sw is the area of the upper bearing portion 71 projected on a plane perpendicular to the central axis 9, and Su is the area of the lower bearing portion 72 projected on a plane perpendicular to the central axis 9. Here, the projected area Sw of the upper bearing portion 71 refers to the area of an annular region between a circumscribed circle and an inscribed circle of the upper dynamic pressure generating groove array 711 projected on the plane of projection. Meanwhile, the projected area Su of lower bearing portion 72 refers to the area of an annular region between a circumscribed circle and an inscribed circle of the lower dynamic pressure generating groove array 721 projected on the plane of projection. The spindle motor 11 according to the present preferred embodiment satisfies the relationship: Sw<Su. An additional reduction in the friction loss at the upper bearing portion 71 is achieved by configuring the projected area Sw of the upper bearing portion 71 to be smaller than the projected area Su of the lower bearing portion 72 as described above. Accordingly, the magnitude of the drive current needed to obtain the desired rotation rate is further reduced.

In addition, it is assumed that W is the weight of the rotating portion 3, and B is the magnitude of an axial component of the magnetic attraction force between the magnetic member 24 and the magnet 34. Then, the spindle motor 11 according to the present preferred embodiment satisfies the relationship: $W \times \{1-(Sw/Su) \times 4\} < B < 1176$. When this relationship is satisfied, it is easy to maintain a condition in which the lower outer circumferential surface 222 and the lower inner circumferential surface 612 are in contact with each other as illustrated in FIG. 6 when the spindle motor 11 is in the stopped state, even if the base 21 is located upward in the vertical direction. That is, it is easy to maintain a condition in which the upper outer circumferential surface 221 and the upper inner circumferential surface 611 are spaced from each other. This eliminates a need to reinforce the upper outer circumferential surface 221 with the protective film 441 made of DLC or the like. More preferably, the spindle motor 11 satisfies the relationship: $W < B < 1176$.

In addition, referring to FIG. 7, it is assumed that, in the section including the central axis 9, a point of intersection of an imaginary straight line which is an extension of the upper outer circumferential surface 221 toward the central axis 9 with an imaginary straight line which is an extension of the lower outer circumferential surface 222 toward the central axis 9 is an imaginary intersection point 225. In the present preferred embodiment, the distance d7 from the imaginary intersection point 225 to the lower end portion of the upper dynamic pressure generating groove array 711 is shorter than the distance d8 from the imaginary intersection point 225 to the upper end portion of the lower dynamic pressure generating groove array 721.

In addition, referring to FIG. 7, in the present preferred embodiment, in the section including the central axis 9, an angle of the upper bearing portion 71 with the central axis 9 and an angle of the lower bearing portion 72 with the central axis 9 preferably are the same angle θ. Note that the term "the same" here comprehends both "the same" and "substantially the same". The above arrangement causes the proportion of the magnitude of a radial component of the dynamic pressure to the magnitude of an axial component of the dynamic pressure to be the same or substantially the same between the upper bearing portion 71 and the lower bearing portion 72. This makes it easy to design both the upper bearing portion 71 and the lower bearing portion 72 taking account of the dynamic pressure. The angle θ is preferably, for example, in the range of about 30 degrees to about 50 degrees. Note that the angle of the upper bearing portion 71 with the central axis 9 and the angle of the lower bearing portion 72 with the central axis 9 may not necessarily be the same.

While preferred embodiments of the present invention have been described above, it is to be understood that the present invention is not limited to the above-described preferred embodiments.

Figure 8:
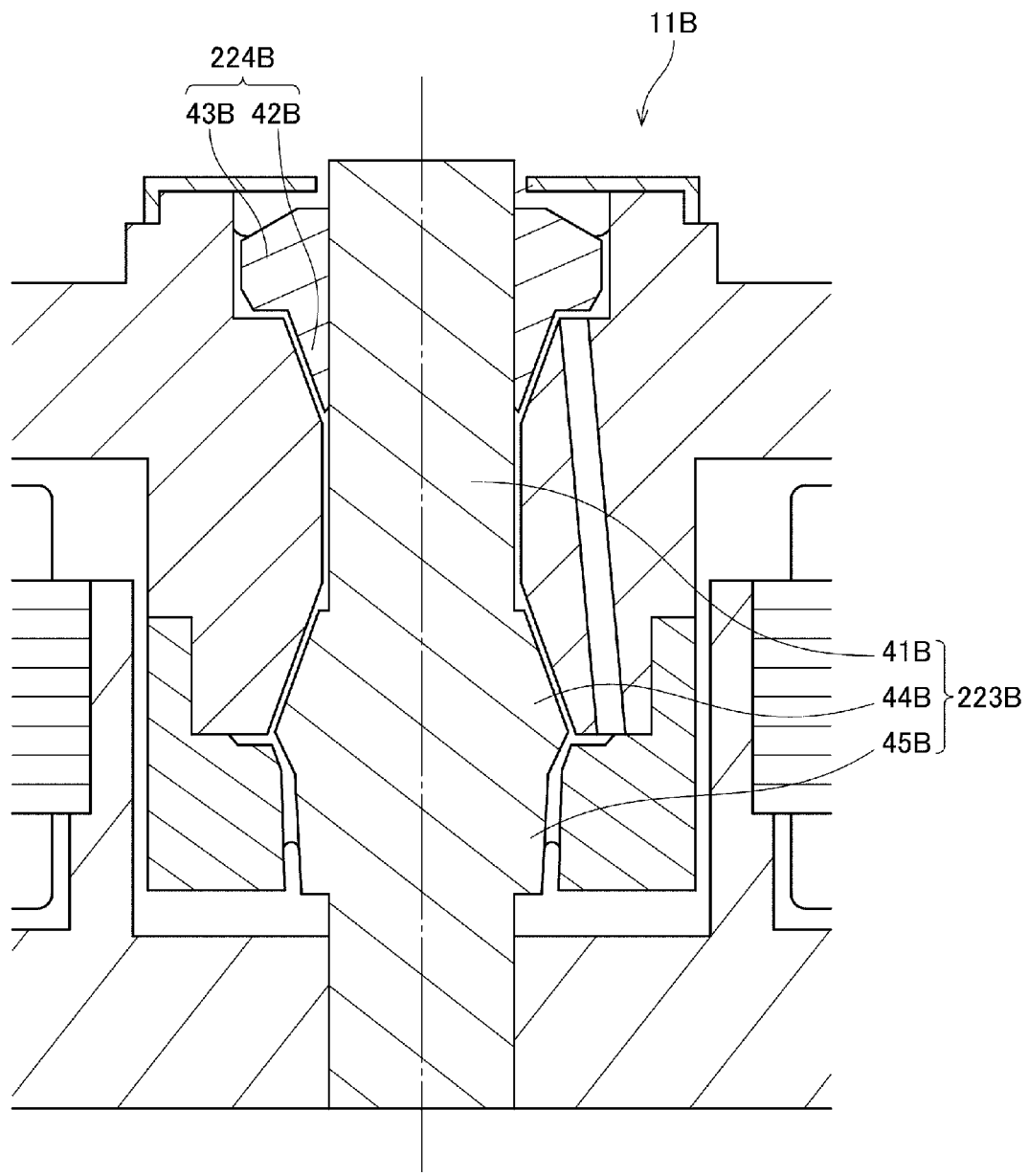
FIG. 8 is a schematic cross-sectional view of a portion of a spindle motor according to a modification of the second preferred embodiment of the present invention.

FIG. 8 is a schematic cross-sectional view of a portion of a spindle motor 11B according to a modification of the above-described preferred embodiment. In the modification illustrated in FIG. 8, a shaft body 41B, a lower cone 44B, and a lower seal projection 45B are preferably defined by a single monolithic first member 223B, while an upper cone 42B and an upper seal projection 43B are preferably defined by a single monolithic second member 224B, which is different from the first member 223B. The second member 224B is preferably fixed to an outer circumferential surface of the shaft body 41B through, for example, press fitting, shrink fitting, an adhesive, or the like.

As described above, the shaft portion may be defined by a combination of members each of which includes two or more of a plurality of portions (i.e., the shaft body, the upper cone, the upper seal projection, the lower cone, and the lower seal projection) of the shaft portion. Also, all the plurality of portions of the shaft portion may be defined by separate members. Also, the shaft portion may be defined by a single monolithic member.

The shape, the number, or the depth of upper dynamic pressure generating grooves and of lower dynamic pressure generating grooves may be adjusted to cause the dynamic pressure induced by the lower dynamic pressure generating grooves to be greater than the dynamic pressure induced by the upper dynamic pressure generating grooves. For example, the number of grooves of the lower dynamic pressure generating groove array 721 may be greater than the number of grooves of the upper dynamic pressure generating groove array 711. Also, the depth of the lower dynamic pressure generating groove array 721 may be greater than the depth of the upper dynamic pressure generating groove array 711. The depth of the upper dynamic pressure generating groove array 711 preferably is, for example, in the range of about 3 μm to about 10 μm. The depth of the lower dynamic pressure generating groove array 721 preferably is, for example, in the range of about 5 μm to about 12 μm.

Although the magnet 34 is preferably located radially outside the stator 23 in the above-described preferred embodiment, the magnet may be located radially inside the stator. That is, it may be so configured such that an outer circumferential surface of the magnet is radially opposite to a radially inner end surface of each of the teeth with a gap intervening therebetween. Also, although the stator 23 and the magnet 34 are radially opposite to each other with the gap intervening therebetween in the above-described preferred embodiment, the stator and the magnet may be axially opposite to each other with a gap intervening therebetween in a spindle motor according to another preferred embodiment of the present invention.

Spindle motors according to preferred embodiments of the present invention may be motors configured to rotate disks other than the magnetic disks, such as, for example, optical disks.

Note that the detailed shape of any member may be different from the shape thereof as illustrated in the accompanying drawings of the present application. Also note that features of the above-described preferred embodiments and the modifications thereof may be combined appropriately as long as no conflict arises.

The preferred embodiments of the present invention and modifications thereof are applicable to spindle motors and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A spindle motor comprising:
a stationary portion;

a rotating portion that is rotatable about a central axis extending in a vertical direction; and
a lubricating fluid provided between the stationary portion and the rotating portion; wherein
the stationary portion includes:
  a base;
  a stator including a plurality of coils with an annular or substantially annular shape and having the central axis as a center;
  a shaft portion extending along the central axis, and including a lower end portion fixed to the base; and
  a magnetic member located on an upper surface of the base;
the shaft portion includes:
  an upper outer circumferential surface inclined with respect to the central axis; and
  a lower outer circumferential surface inclined with respect to the central axis, and located below the upper outer circumferential surface;
a radial distance between the upper outer circumferential surface and the central axis decreases with decreasing height;
a radial distance between the lower outer circumferential surface and the central axis decreases with increasing height;
the rotating portion includes:
  a tubular sleeve including a central through hole through which the shaft portion is inserted; and
  a magnet opposite to the stator with a gap intervening therebetween, and located above the magnetic member;
the sleeve includes:
  an upper inner circumferential surface opposite to the upper outer circumferential surface, and inclined with respect to the central axis; and
  a lower inner circumferential surface opposite to the lower outer circumferential surface below the upper inner circumferential surface, and inclined with respect to the central axis;
a radial distance between the upper inner circumferential surface and the central axis decreases with decreasing height;
a radial distance between the lower inner circumferential surface and the central axis decreases with increasing height;
the shaft portion, the sleeve, and the lubricating fluid together define a fluid dynamic bearing;
the fluid dynamic bearing includes:
  an upper bearing portion including an upper dynamic pressure generating groove defined in at least one of the upper outer circumferential surface and the upper inner circumferential surface, and configured to induce a dynamic pressure during rotation of the rotating portion; and
  a lower bearing portion including a lower dynamic pressure generating groove defined in at least one of the lower outer circumferential surface and the lower inner circumferential surface, and configured to induce a dynamic pressure during the rotation of the rotating portion;
both the upper bearing portion and the lower bearing portion are filled with the lubricating fluid; and
a radial distance between a lower end portion of the upper dynamic pressure generating groove and the central axis is shorter than a radial distance between an upper end portion of the lower dynamic pressure generating groove and the central axis.

2. The spindle motor according to claim 1, wherein, in a section including the central axis, a distance from the lower end portion of the upper dynamic pressure generating groove to a point of intersection of an imaginary straight line which is an extension of the upper outer circumferential surface toward the central axis with an imaginary straight line which is an extension of the lower outer circumferential surface toward the central axis is shorter than a distance from the upper end portion of the lower dynamic pressure generating groove to the intersection point.

3. The spindle motor according to claim 1, wherein Sw<Su, where Sw is an area of the upper bearing portion projected on a plane perpendicular to the central axis, and Su is an area of the lower bearing portion projected on the plane perpendicular to the central axis.

4. The spindle motor according to claim 1, wherein, in a section including the central axis, a length of the upper bearing portion is equal to or smaller than a length of the lower bearing portion.

5. The spindle motor according to claim 1, wherein the dynamic pressure induced by the lower dynamic pressure generating groove is greater than the dynamic pressure induced by the upper dynamic pressure generating groove.

6. The spindle motor according to claim 1, wherein, in a section including the central axis, an angle of the upper bearing portion with the central axis and an angle of the lower bearing portion with the central axis are the same.

7. The spindle motor according to claim 1, wherein
the shaft portion includes:
  a shaft body overlapping with the central axis in a plan view; and
  a conical lower cone separate from the shaft body, and including the lower outer circumferential surface; and
the lower cone includes a protective film covering the lower outer circumferential surface.

8. The spindle motor according to claim 1, further comprising:
an upper seal portion in communication with the upper bearing portion; and
a lower seal portion in communication with the lower bearing portion; wherein
the lubricating fluid includes an upper liquid surface and a lower liquid surface located above the upper bearing portion and below the lower bearing portion, respectively;
the upper seal portion is configured to hold the upper liquid surface of the lubricating fluid;
the lower seal portion is configured to hold the lower liquid surface of the lubricating fluid;
the sleeve includes:
  a communicating hole located radially outward of the central through hole, and passing through the sleeve from an upper surface to a lower surface of the sleeve; and
the lubricating fluid completely fills a gap extending from the upper seal portion to the lower seal portion through the communicating hole and a gap between the shaft portion and the sleeve.

9. The spindle motor according to claim 8, wherein
an upper opening of the communicating hole is located radially inward of a lower opening of the communicating hole; and
the communicating hole extends in a straight line from the upper opening to the lower opening.

10. The spindle motor according to claim 8, wherein
the rotating portion includes an annular member separate from the sleeve; and the lower seal portion is defined by an outer circumferential surface of the stationary portion and an inner circumferential surface of the annular member.

11. The spindle motor according to claim 10, wherein
the base includes an annular projection located radially outside the annular member; and
an outer circumferential surface of the annular member and an inner circumferential surface of the annular projection are radially opposite to each other with a slight gap intervening therebetween.

12. The spindle motor according to claim 8, wherein
the upper seal portion includes an upper capillary seal portion where a radial distance between the stationary portion and the rotating portion increases with increasing height, and the lower seal portion includes a lower capillary seal portion where the radial distance between the stationary portion and the rotating portion increases with decreasing height; and
the lower capillary seal portion is located radially inward of the upper capillary seal portion.

13. The spindle motor according to claim 12, wherein the upper seal portion further includes a pumping seal portion located closer to the upper bearing portion than is the upper capillary seal portion, and configured to press the lubricating fluid toward the upper bearing portion during the rotation of the rotating portion.

14. The spindle motor according to claim 13, wherein
a radial distance between the central axis and a portion of an outer circumferential surface of the stationary portion which defines the lower capillary seal portion decreases with decreasing height;
a radial distance between the central axis and a portion of an inner circumferential surface of the rotating portion which defines the lower capillary seal portion decreases with decreasing height; and
an angle of the portion of the outer circumferential surface with the central axis is greater than an angle of the portion of the inner circumferential surface with the central axis.

15. A disk drive apparatus comprising:
the spindle motor of claim 1;
an access portion configured to perform at least one of reading and writing of information from or to a disk supported by the rotating portion of the spindle motor; and
a cover that covers an upper portion of the base; wherein
the rotating portion and the access portion are accommodated in a case defined by the base and the cover.

16. A spindle motor comprising:
a stationary portion;
a rotating portion that is rotatable about a central axis extending in a vertical direction; and
a lubricating fluid provided between the stationary portion and the rotating portion; wherein
the stationary portion includes:
a base;
a stator including a plurality of coils with an annular or substantially annular shape and having the central axis as a center;
a shaft portion extending along the central axis, and including a lower end portion fixed to the base; and
a magnetic member located on an upper surface of the base;
the shaft portion includes:
an upper outer circumferential surface inclined with respect to the central axis; and
a lower outer circumferential surface inclined with respect to the central axis, and located below the upper outer circumferential surface;
a radial distance between the upper outer circumferential surface and the central axis decreases with decreasing height;
a radial distance between the lower outer circumferential surface and the central axis decreases with increasing height;
the rotating portion includes:
a tubular sleeve including a central through hole through which the shaft portion is inserted; and
a magnet opposite to the stator with a gap intervening therebetween, and located above the magnetic member;
the sleeve includes:
an upper inner circumferential surface opposite to the upper outer circumferential surface, and inclined with respect to the central axis; and
a lower inner circumferential surface opposite to the lower outer circumferential surface below the upper inner circumferential surface, and inclined with respect to the central axis;
a radial distance between the upper inner circumferential surface and the central axis decreases with decreasing height;
a radial distance between the lower inner circumferential surface and the central axis decreases with increasing height;
the shaft portion, the sleeve, and the lubricating fluid together define a fluid dynamic bearing;
the fluid dynamic bearing includes:
an upper bearing portion including an upper dynamic pressure generating groove defined in at least one of the upper outer circumferential surface and the upper inner circumferential surface, and configured to induce a dynamic pressure during rotation of the rotating portion; and
a lower bearing portion including a lower dynamic pressure generating groove defined in at least one of the lower outer circumferential surface and the lower inner circumferential surface, and configured to induce a dynamic pressure during the rotation of the rotating portion;
both the upper bearing portion and the lower bearing portion are filled with the lubricating fluid; and $Sw<Su$, and $W\times\{1-(Sw/Su)\times4\}<B<1176,$ where W is a weight of the rotating portion, Sw is an area of the upper bearing portion projected on a plane perpendicular to the central axis, Su is an area of the lower bearing portion projected on the plane perpendicular to the central axis, and B is a magnitude of an axial component of a magnetic attraction force between the magnetic member and the magnet.

17. The spindle motor according to claim 16, wherein, in a section including the central axis, a length of the upper bearing portion is equal to or smaller than a length of the lower bearing portion.

18. The spindle motor according to claim 16, wherein the dynamic pressure induced by the lower dynamic pressure generating groove is greater than the dynamic pressure induced by the upper dynamic pressure generating groove.

19. The spindle motor according to claim 18, wherein a depth of the lower dynamic pressure generating groove is greater than a depth of the upper dynamic pressure generating groove.

20. The spindle motor according to claim 16, wherein W<B<1176.

21. The spindle motor according to claim 16, wherein, in a section including the central axis, an angle of the upper bearing portion with the central axis and an angle of the lower bearing portion with the central axis are the same.

22. The spindle motor according to claim 16, wherein the shaft portion includes:
   a shaft body overlapping with the central axis in a plan view; and
   a conical lower cone separate from the shaft body, and including the lower outer circumferential surface.

23. The spindle motor according to claim 22, further comprising a protective film covering the lower outer circumferential surface of the lower cone.

24. The spindle motor according to claim 16, wherein the shaft portion includes:
   a shaft body overlapping with the central axis in a plan view; and
   a conical upper cone separate from the shaft body, and including the upper outer circumferential surface.

25. The spindle motor according to claim 16, wherein a radial distance between an upper end portion of the upper dynamic pressure generating groove and the central axis is shorter than a radial distance between a lower end portion of the lower dynamic pressure generating groove and the central axis.

26. The spindle motor according to claim 16, further comprising:
   an upper seal portion in communication with the upper bearing portion; and
   a lower seal portion in communication with the lower bearing portion; wherein
   the lubricating fluid includes an upper liquid surface and a lower liquid surface located above the upper bearing portion and below the lower bearing portion, respectively;
   the upper seal portion is configured to hold the upper liquid surface of the lubricating fluid;
   the lower seal portion is configured to hold the lower liquid surface of the lubricating fluid;
   the sleeve includes:
      a communicating hole located radially outward of the central through hole, and passing through the sleeve from an upper surface to a lower surface of the sleeve; and
   the lubricating fluid completely fills a gap extending from the upper seal portion to the lower seal portion through the communicating hole and a gap between the shaft portion and the sleeve.

27. The spindle motor according to claim 26, wherein
   an upper opening of the communicating hole is located radially inward of a lower opening of the communicating hole; and
   the communicating hole extends in a straight line from the upper opening to the lower opening.

28. The spindle motor according to claim 26, wherein
   the rotating portion includes an annular member separate from the sleeve; and
   the lower seal portion is defined by an outer circumferential surface of the stationary portion and an inner circumferential surface of the annular member.

29. The spindle motor according to claim 28, wherein
   the base includes an annular projection located radially outside the annular member; and
   an outer circumferential surface of the annular member and an inner circumferential surface of the annular projection are radially opposite to each other with a slight gap intervening therebetween.

30. The spindle motor according to claim 26, wherein the upper seal portion includes an upper capillary seal portion where a radial distance between the stationary portion and the rotating portion increases with increasing height.

31. The spindle motor according to claim 30, wherein the upper seal portion further includes a pumping seal portion located closer to the upper bearing portion than is the upper capillary seal portion, and configured to press the lubricating fluid toward the upper bearing portion during the rotation of the rotating portion.

32. The spindle motor according to claim 30, wherein
   the lower seal portion includes a lower capillary seal portion where the radial distance between the stationary portion and the rotating portion increases with decreasing height; and
   the lower capillary seal portion is located radially inward of the upper capillary seal portion.

33. The spindle motor according to claim 32, wherein
   a radial distance between the central axis and a portion of an outer circumferential surface of the stationary portion which defines the lower capillary seal portion decreases with decreasing height;
   a radial distance between the central axis and a portion of an inner circumferential surface of the rotating portion which defines the lower capillary seal portion decreases with decreasing height; and
   an angle of the portion of the outer circumferential surface with the central axis is greater than an angle of the portion of the inner circumferential surface with the central axis.

* * * * *